United States Patent [19]

Lee

[11] Patent Number: 5,757,382
[45] Date of Patent: May 26, 1998

[54] APPARATUS FOR TRACING CONTOURS OF SEGMENTED REGIONS

[75] Inventor: Min-Sup Lee, Seoul, Rep. of Korea

[73] Assignee: Daewoo Electronics Co., Ltd., Seoul, Rep. of Korea

[21] Appl. No.: 581,648

[22] Filed: Dec. 28, 1995

[30] Foreign Application Priority Data

Dec. 29, 1994 [KR] Rep. of Korea ............... 1994-38607

[51] Int. Cl.$^6$ ............................................. G06T 9/20
[52] U.S. Cl. ................... 345/441; 382/242; 382/266; 382/316
[58] Field of Search ............... 395/141–43; 382/303, 382/199, 205, 242, 266, 316; 345/144

[56] References Cited

U.S. PATENT DOCUMENTS

| 5,025,478 | 6/1991 | Morris et al. | 382/199 |
| 5,265,173 | 11/1993 | Griffin et al. | 382/103 |
| 5,271,093 | 12/1993 | Hata et al. | 345/420 |
| 5,572,603 | 11/1996 | Koike | 382/199 |
| 5,621,819 | 4/1997 | Hozumi | 382/232 |

OTHER PUBLICATIONS

Serra, Introduction to Mathematical Morphology, Computer Vision, Graphics and Image Processing, v. 35, n. 3, pp. 283–305, 1986.

*Primary Examiner*—Almis R. Jankus
*Assistant Examiner*—Jae-Hee Choi
*Attorney, Agent, or Firm*—Anderson Kill & Olick, P.C.

[57] ABSTRACT

An apparatus for tracing contours of segmented regions in an image includes a zero masking unit to produce a closed contour loop for each of the segmented regions, a tracing circuit for sequentially assigning each of the non-zero masked pixels on the closed contour loop as a tracing pixel, comparing the tracing pixel with a set of its adjacent pixels located at a rightward, an upward, a leftward and a downward directions with respect to the tracing pixel to select one of the adjacent pixels having a luminance level identical to that of the tracing pixel and updating the tracing pixel with the selected adjacent pixel with until the updated tracing pixel coincides with the tracing pixel selected first.

7 Claims, 4 Drawing Sheets

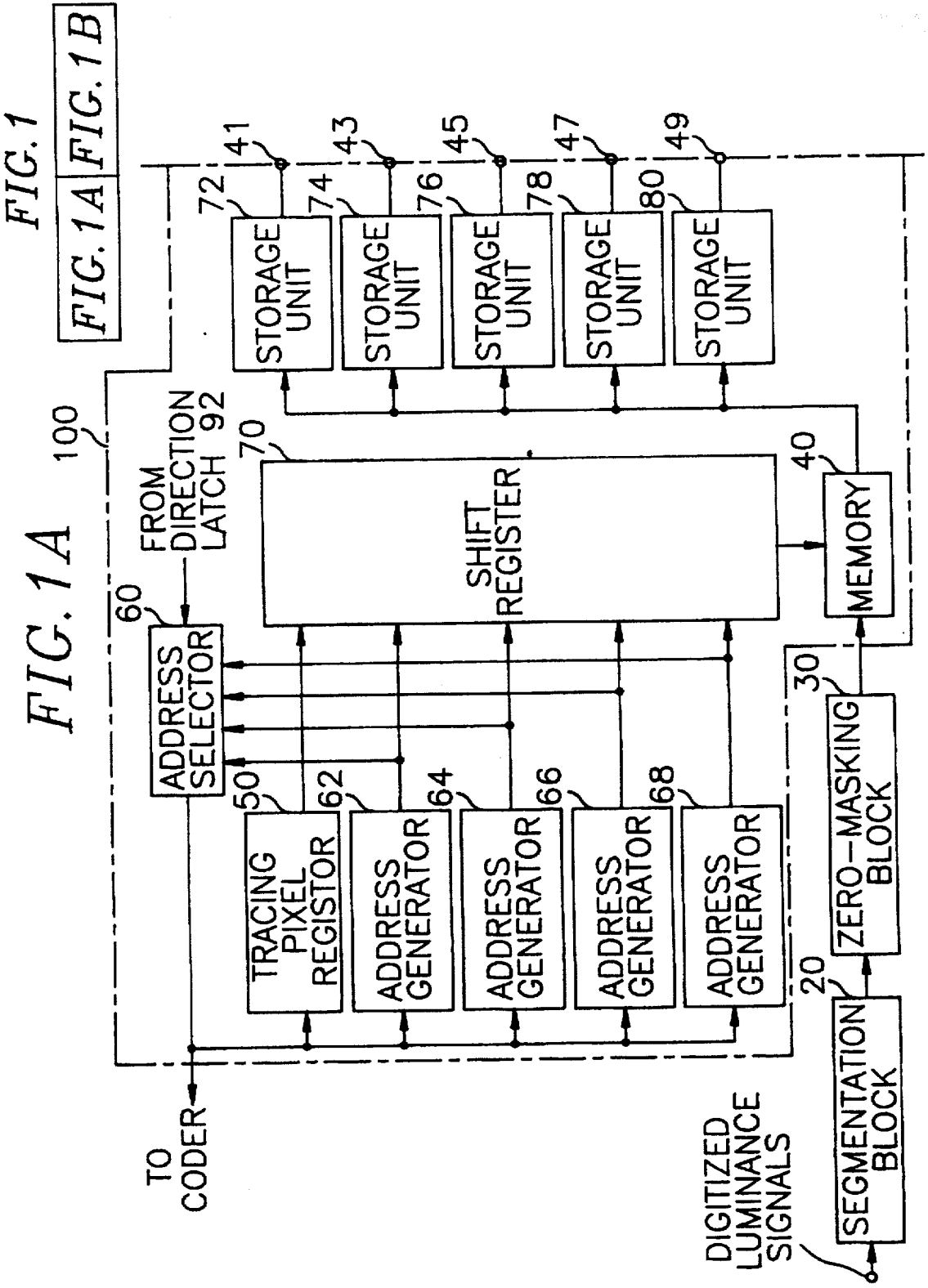

APPARATUS FOR TRACING CONTOURS OF SEGMENTED REGIONS

FIELD OF THE INVENTION

The present invention relates to a video signal coding system employing an image segmentation technique; and, more particularly, to an apparatus for tracing contours of segmented regions in an image to extract contour information therefor.

DESCRIPTION OF THE PRIOR ART

In a digital video system such as video-telephone, teleconference or high definition television, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video coding applications as video-telephone and teleconference systems.

One of such methods for encoding video signals for a low bit-rate encoding system is the so-called image segmentation approach employing a region-based segmentation technique.

The main idea underlying the region-based segmentation technique is to identify various regions in an image that have similar features. One class of the region-based techniques involves the concept of region expansion, wherein the image is segmented first into atomic regions of constant grey levels. Thereafter, similar adjacent atomic regions are merged sequentially until the merged regions become sufficiently different; and these distinct merged regions are called segmented regions in the image.

The segmented regions are subjected to a conventional contour-projection technique to trace boundaries thereof by following successive edge points. However, this technique can yield a coarse contour, with some of the boundary pixels counted twice.

SUMMARY OF THE INVENTION

It is, therefore, a primary object of the invention to provide an apparatus for effectively tracing contours of segmented regions in an image.

In accordance with the present invention, there is provided an apparatus for tracing contours of segmented regions in an image, wherein all pixels in each of the segmented regions are of a constant luminance level, the apparatus comprising:

means for selecting center pixels among all pixels in the image, each center pixel having eight surrounding pixels of an identical luminance level;

means for zero masking the center pixels to thereby provide a closed contour loop for each segmented region, wherein the constant luminance level of each of the center pixels in said each segmented region is replaced by a zero-valued luminance level and the closed contour loop consists of non-zero masked pixels having the constant luminance level;

means for initiating a contour tracing for the closed contour loop by selecting a tracing pixel from the non-zero masked pixels on the closed contour loop;

means for comparing adjacent pixels to the tracing pixel to determine if more than one adjacent pixels have a luminance level identical to that of the tracing pixel;

means for updating the contour tracing by designating one of said more than one adjacent pixels as the tracing pixel based on a predetermined priority therefor;

means for repeating the process of updating the contour tracing until the designated adjacent pixel coincides with the tracing pixel selected first; and means for providing position information for each of the tracing pixels, thereby completing the contour tracing for the closed contour loop.

BRIEF DESCRIPTION OF THE DRAWINGS

The above and other objects and features of the present invention will become apparent from the following description of preferred embodiments given in conjunction with the accompanying drawings, in which:

FIGS. 1A and 1B show a block diagram of a contour tracing apparatus in accordance with the present invention;

FIGS. 2A and 2B illustrate exemplary diagrams explaining a segmentation process and a zero masking process in accordance with the invention.

DETAILED DESCRIPTION OF THE PREFERRED EMBODIMENTS

Figure 1B:
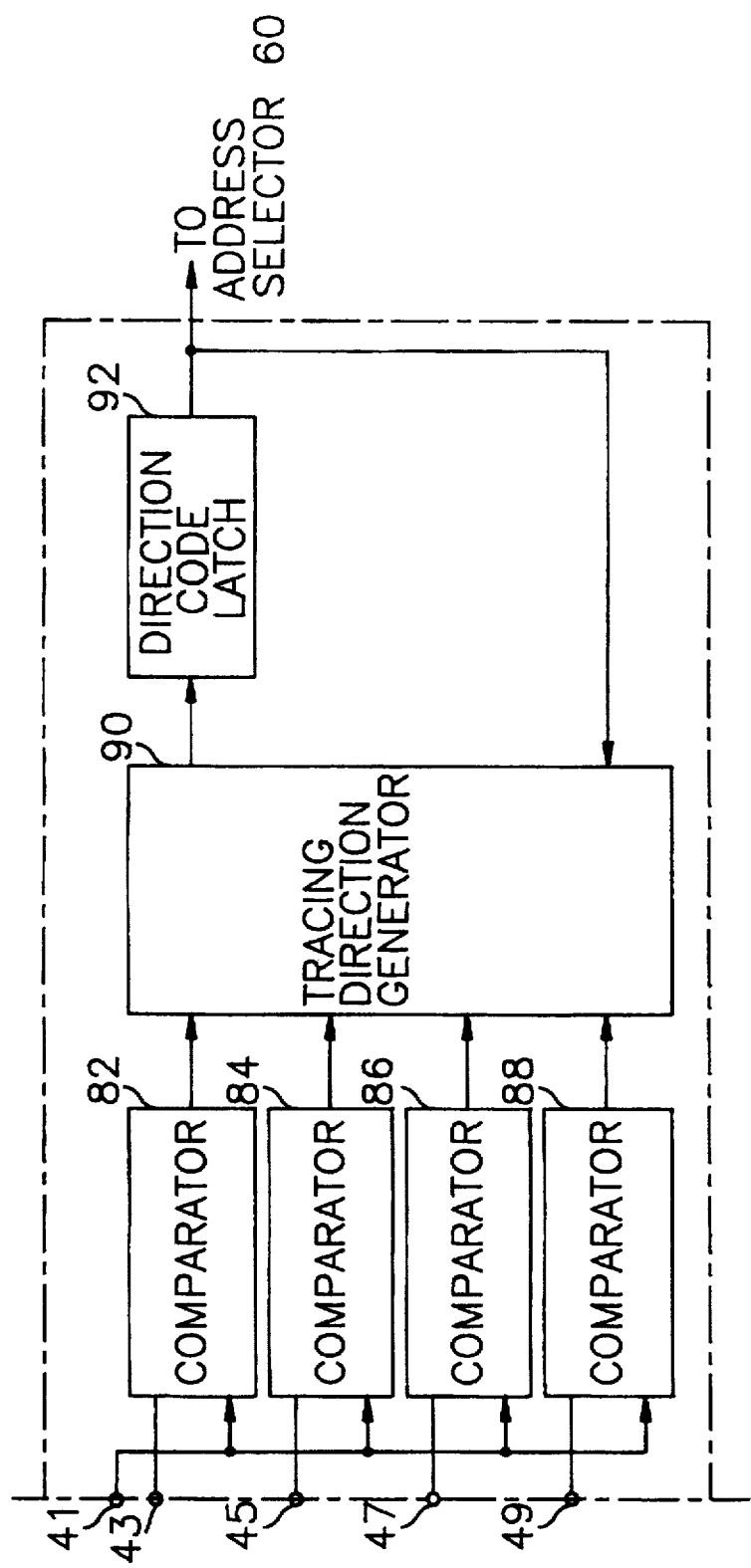

Referring to FIG. 1, there is shown a block diagram of an apparatus for tracing contours of segmented regions. The apparatus comprises a segmentation block 20, a zero-masking block 30 and a tracing block 100.

Digitized luminance signals representing a video frame image are fed to the segmentation block 20. In the segmentation block 20, the digitized luminance signals are grouped into a plurality of constant luminance levels to produce a segmented image including a plurality of segmented regions wherein each of the segmented regions consists of pixels having an identical or constant luminance level. The luminance levels for the segmented regions are supplied to the zero masking block 30.

The zero masking block 30 executes a zero masking process with respect to the segmented image wherein a zero value is assigned to each center pixel, each center pixel being a pixel which is surrounded by eight pixels of a constant luminance level.

Figures 2A, 2B:
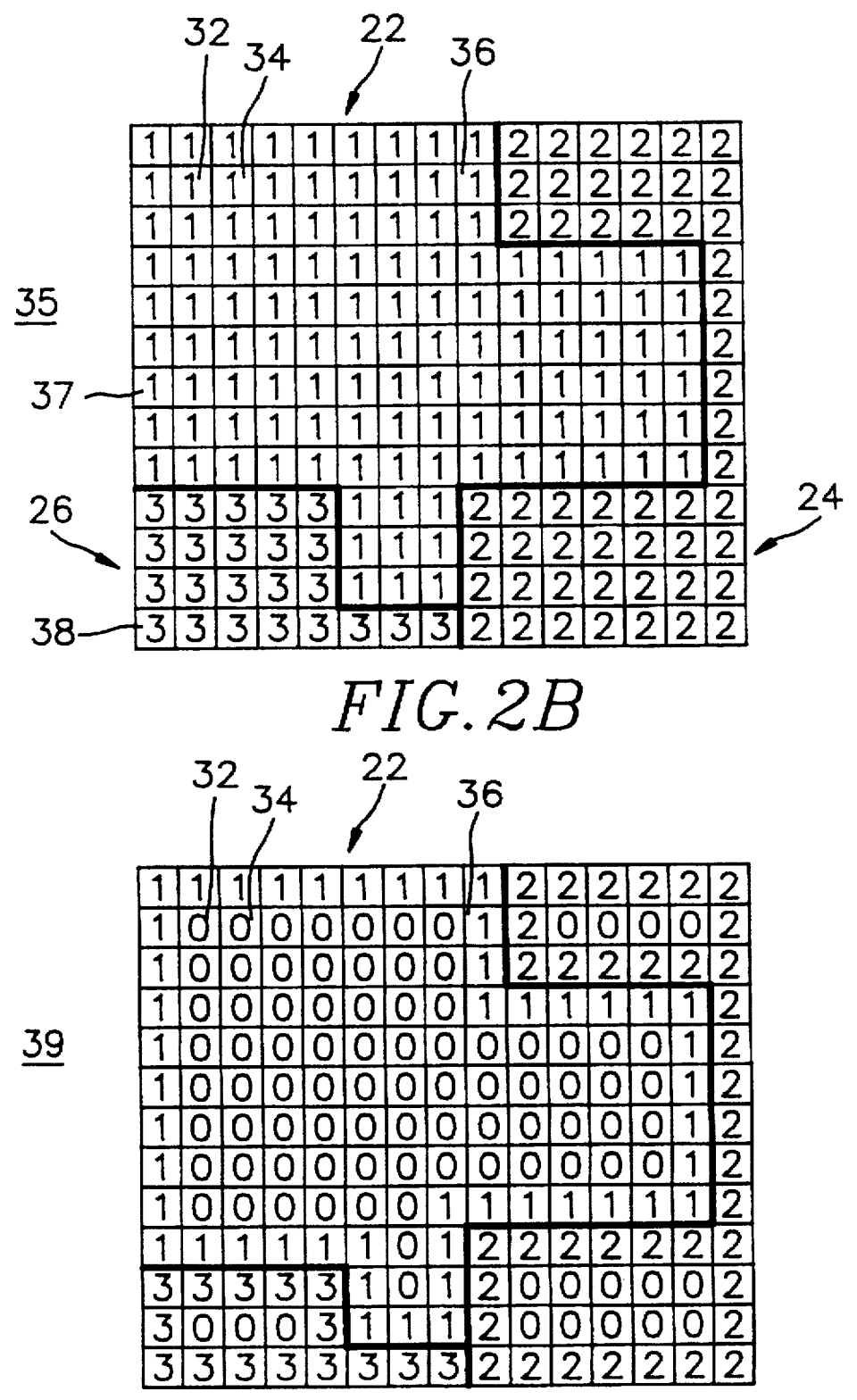

With reference to FIGS. 2A and 2B, there is illustrated the zero masking process, wherein a segmented image 35 is segmented into, e.g., three regions 22, 24 and 26 of the constant luminance levels of "1", "2" and "3". For instance, pixel 32 within the segmented region 22 is surrounded by eight pixels having the constant luminance level "1" and, therefore, it is selected as a center pixel. Similarly, pixel 34 also becomes a center pixel. However, in case of pixel 36, since its eight surrounding pixels are not of a constant luminance level, the pixel 36 is not a center pixel. In case of such pixels located on the edge of the image as 37 and 38, since they do not have eight surrounding pixels, these edge pixels cannot become center pixels. The above zero masking process is performed on all of the pixels within the segmented image 35. The result of the zero masking process is illustrated in FIG. 2B wherein a closed contour loop for each segmented region is formed within a zero-masked image 39 by pixels of non-zero constant luminance levels. Data for the zero-masked image 39 is fed to a memory 40 shown in FIG. 1A for the storage thereof.

It should be noted that if a segmented region has a zero-valued constant luminance level, the luminance level for such a segmented region is replaced by a non-zero valued constant luminance level which is different from the luminance levels of its neighboring segmented regions. Such preprocessing is necessary in order to delineate a contour loop for such a segmented region. For center pixels are masked to have zero values.

Thereafter, at the tracing block 100 shown in FIG. 1, contour tracing is carried out with respect to the zero-masked image 39 on a pixel-by-pixel basis to thereby extract position information for the non-zero masked pixels on each closed contour loop.

Figure 3:
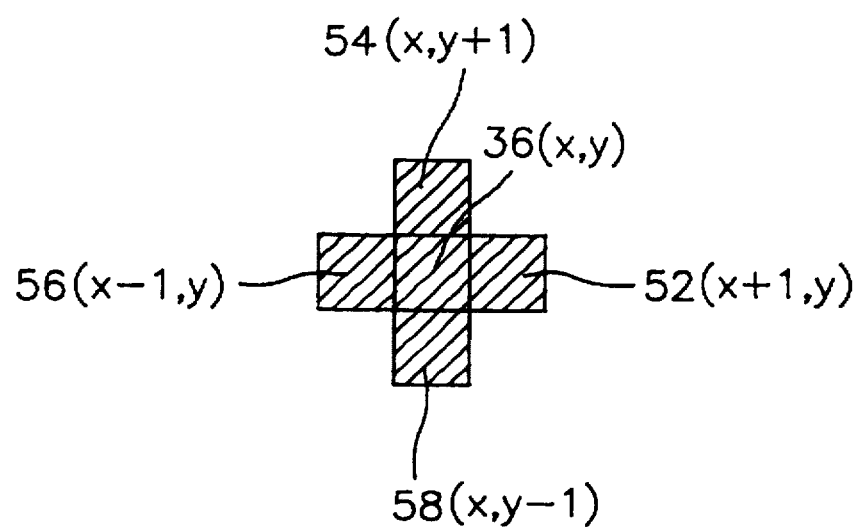
FIG. 3 represents an exemplary diagram illustrating a tracing process for extracting contour information of segmented regions.

In order to trace the closed contour loop, one of non-zero masked pixels on the closed contour loop is selected first as a tracing pixel; and then a next tracing pixel is selected from one of its adjacent pixels, each adjacent pixel and the tracing pixel adjoining each other by their edges. The contour tracing procedure is repeated with respect to a newly selected tracing pixel until the newly selected tracing pixel coincides with the tracing pixel selected first. For example, when a non-zero masked pixel 36 on the closed loop for the segmented region 22 is selected as the tracing pixel, its ad-adjacent pixels are determined, as shown in FIG. 3, the adjacent pixels 52, 54, 56 and 58 being located at a rightward, an upward, a leftward and a downward directions with respect to the tracing pixel 36. If the tracing pixel 36 is located at a position (x, y), the adjacent pixels 52, 54, 56 and 58 will have positions at (x+1, y), (x, y+1), (x−1, y) and (x, y−1). Based on the position information thereof, the luminance levels of the tracing pixel 36 and the adjacent pixels 52, 54, 56 and 58 can be derived from the memory 40. And then, the luminance level of the tracing pixel 36 is compared with those for its adjacent pixels 52, 54, 56 and 58 in order to select one or more adjacent pixels having a luminance level identical to that of the tracing pixel 36. In accordance with the invention, a priority is given to the rightward, upward, leftward and downward directions in that order so that only one of the adjacent pixels with the identical luminance level is selected as a next tracing pixel.

Referring back to FIG. 1, a tracing pixel register 50 is provided with the tracing address (x, y) of a tracing pixel on the closed contour loop 22. A set of four address generators 62, 64, 66 and 68, in response to the tracing address, generates a set of adjacent addresses (x+1, y), (x, y+1), (x−1, y), (x, y−1) of the adjacent pixels located at the rightward, the upward, the leftward and the downward directions with respect to the tracing pixel. The tracing address and the set of four adjacent addresses are provided to an address selector 60 and to a shift register 70. The shift register 70 sequentially generates the address signals to sequentially address the memory locations in the memory 40 in which the luminance levels of the tracing and the adjacent pixels are stored. The luminance levels sequentially read from the memory 40 are fed to a set of luminance storage units 72, 74, 76, 78 and 80 in such a manner that the luminance level of the tracing pixel is applied to a first storage unit 72 and the set of four luminance level of the adjacent pixels are applied to a second, a third, a fourth and a fifth storage units 74, 76, 78 and 80, respectively.

The luminance levels in the second to the fifth storage units 74, 76, 78 and 80 are supplied through lines 41, 43, 45, 47 and 49 to their corresponding comparators 82, 84, 86 and 88 which also receive the luminance level data from the first storage unit 72.

Each of the comparators 82, 84, 86 and 88 compares the luminance level of the tracing pixel with each of the luminance levels of the adjacent pixels. If the luminance level of the tracing pixel is identical to the luminance levels of the adjacent pixels, each of the comparators 82, 84, 86 and 88 generates a tracing direction selection signal.

A tracing direction generator 90 has a set of four direction codes. The direction codes include, e.g., "00", "01", "10" and "11" which indicate the leftward, the upward, the rightward and the downward directions corresponding to the position of the selected adjacent pixel, respectively. The tracing direction generator 90, in response to each of the tracing direction selection signals, produces a direction code corresponding thereto. The direction code from the tracing direction generator 90 is transmitted through a tracing direction code latch 92 to the address selector 60.

In tracing the closed contour loop, there may occur a situation where a newly selected tracing pixel may coincide with its previous tracing pixel, which will cause a reverse tracing. Therefore, in order to prevent such a reverse tracing, in accordance with the invention, the tracing direction generator 90 compares the direction codes generated by the tracing direction selection signals with a previous direction code provided from the direction code latch 92. The comparison with respect to the previous direction code is carried out in the sequence of the rightward, upward, leftward and downward direction codes as described above. Accordingly, if the tracing direction code is different from the previous direction code, the tracing direction generator 90 provides an enable signal to the direction code latch 92. The enable signal is used to allow the latch 92 to transmit the direction code latched therein to the address selector 60. The direction code is also supplied to the tracing direction generator 90 as a previous direction code.

The address selector 60, in response to the direction code from the direction code latch 92, selects one of the address signals provided from the address generators 62, 64, 66 and 68 corresponding to the direction code. The selected adjacent address signal is then provided to the tracing pixel register 50 so that the selected adjacent address is updated with the tracing address. Further, the address generators 62, 64, 66 and 68, in response to the selected address from the address selector 60, generate a set of adjacent addresses based on the selected address. The selected address is also provided to a coding scheme (not shown) as a part of the contour information.

Such a tracing operation is repeated with respect to the updated address until the tracing process returns to the starting point and, in turn, is applied to the remaining segmented regions 24 and 26 in the image 35.

While the present invention has been described with respect to the particular embodiments, it will be apparent to those skilled in the art that various changes and modifications may be made without departing from the scope of the invention as defined in the following claims.

What is claimed is:

1. Apparatus for tracing contours of segmented regions in an image, wherein all pixels in each of the segmented regions have a substantially constant luminance level, the apparatus comprising:

means for selecting center pixels among all pixels in the image, each center pixel being surrounded by eight pixels from a corresponding segmented region;

means for zero masking the center pixels to form closed contour loops for the segmented regions, respectively, wherein the luminance level of each center pixel in each of the segmented regions is replaced by a zero-valued luminance level such that a corresponding closed contour loop consisting of non-zero masked pixels having substantially constant luminance level surrounds the zero masked center pixels;

means for tracing contours of said closed contour loops by selecting a respective tracing pixel for each of said closed contour loops, said respective tracing pixel being selected from the non-zero masked pixels of a respective closed contour loop;

means for comparing the luminance levels of tracing pixels to a respective set of adjacent pixels, wherein each adjacent pixel of said respective set is adjacent to said respective tracing pixel and wherein the luminance level of each of said tracing pixels is compared to said respective set of adjacent pixels to determine whether more than one adjacent pixel in said respective set has a luminance level substantially identical to said each of said tracing pixels;

means for providing positional information of each of said tracing pixels if it is determined that more than one adjacent pixel has a luminance level substantially identical to said each of said tracing pixel as a part of contour information to a coding device;

means for assigning a next tracing pixel from said respective set of adjacent pixels for each of said closed contour loops in accordance with a predetermined priority; and a device for operating said tracing device, said comparator, said positional device and said assigning device on said next tracing pixel until a newly assigned next tracing pixel coincides with said respective tracing pixel for each of said closed contour loops.

2. The apparatus of claim 1, wherein said respective set of adjacent pixels is comprised of four pixels located at a rightward, an upward, a leftward and a downward directions with respect to said respective tracing pixel.

3. The apparatus of claim 2, wherein said predetermined priority is in the order of rightward, upward, leftward and downward directions.

4. Apparatus for tracing contours of segmented regions in an image, wherein all pixels in each of the segmented regions have non-zero luminance level, said apparatus comprising:

a pixel selector for selecting center pixels from each of said segmented region;

a masking device for zero masking the center pixels by setting the luminance level of said center pixels to zero to provide zero masked center pixels such that closed contour loops consisting of non-zero masked pixels surround said zero masked center pixels, respectively;

a tracing device for tracing contours of said closed contour loops by selecting a respective tracing pixel for each of said closed contour loops, said respective tracing pixel being selected from said non-zero masked pixels of a respective closed contour loop;

a comparator for comparing the luminance levels of tracing pixels to a respective set of adjacent pixels, wherein each adjacent pixel of said respective set is adjacent to said respective tracing pixel and wherein the luminance level of each of said tracing pixels is compared to said respective set of adjacent pixels to determine whether more than one adjacent pixel in said respective set has a luminance level substantially identical to said each of said tracing pixels;

a positional device for providing positional information of each of said tracing pixels if it is determined that more than one adjacent pixel has a luminance level substantially identical to said each of said tracing pixel;

an assigning device for assigning a next tracing pixel from said respective set of adjacent pixels for each of said closed contour loops in accordance with a predetermined priority; and a device for operating said tracing device, said comparator, said positional device and said assigning device on said next tracing pixel until a newly assigned next tracing pixel coincides with said respective tracing pixel for each of said closed contour loops.

5. The apparatus of claim 4, wherein said respective set of adjacent pixels is comprised of four pixels located at a rightward, an upward, a leftward and a downward directions with respect to said respective tracing pixel.

6. The apparatus of claim 5, wherein said predetermined priority is in the order of rightward, upward, leftward and downward directions.

7. A method for tracing contours of segmented regions in an image, wherein all pixels in each of the segmented regions have non-zero luminance level, comprising the steps of:

selecting center pixels from each of said segmented region;

masking the center pixels by setting the luminance level of said center pixels to zero to provide zero masked center pixels such that closed contour loops consisting of non-zero masked pixels surround said zero masked center pixels, respectively;

tracing contours of said closed contour loops by selecting a respective tracing pixel for each of said closed contour loops, said respective tracing pixel being selected from said non-zero masked pixels of a respective closed contour loop;

comparing the luminance levels of tracing pixels to a respective set of adjacent pixels, wherein each adjacent pixel of said respective set is adjacent to said respective tracing pixel and wherein the luminance level of each of said tracing pixels is compared to said respective set of adjacent pixels to determine whether more than one adjacent pixel in said respective set has a luminance level substantially identical to said each of said tracing pixels;

providing positional information of each of said tracing pixels if it is determined that more than one adjacent pixel has a luminance level substantially identical to said each of said tracing pixel;

assigning a next tracing pixel from said respective set of adjacent pixels for each of said closed contour loops in accordance with a predetermined priority; and repeating the steps of tracing, comparing, providing and assigning for said next tracing pixel until a newly assigned next tracing pixel coincides with said respective tracing pixel for each of said closed contour loops.

* * * * *

UNITED STATES PATENT AND TRADEMARK OFFICE
CERTIFICATE OF CORRECTION

PATENT NO. : 5,757,382
DATED : May 26, 1998
INVENTOR(S) : Min-Sup Lee

It is certified that error appears in the above-identified patent and that said Letters Patent is hereby corrected as shown below:

On the title page item:

[30]  Foreign Application Priority Data

Dec. 29, 1994   [KR]   Rep. of Korea        94-38607

Claim 4, line 3, change "non-zero" to -- a substantially constant --,

Claim 7, line 3, change "non-zero" to - a substantially constant --

Signed and Sealed this

First Day of September, 1998

Attest:

BRUCE LEHMAN

Attesting Officer            Commissioner of Patents and Trademarks